US007668575B2

(12) United States Patent
Park et al.

(10) Patent No.: US 7,668,575 B2
(45) Date of Patent: Feb. 23, 2010

(54) SYSTEM AND METHOD FOR OBTAINING RADIATION CHARACTERISTICS OF BUILT-IN ANTENNA IN MOBILE COMMUNICATION TERMINAL

(75) Inventors: Byung-Duck Park, Gyeonggi-Do (KR); Soo-Cheoul Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 910 days.

(21) Appl. No.: 10/900,317

(22) Filed: Jul. 28, 2004

(65) Prior Publication Data

US 2005/0026660 A1 Feb. 3, 2005

(30) Foreign Application Priority Data

Jul. 30, 2003 (KR) ...................... 10-2003-0052844

(51) Int. Cl.
*H04M 1/00* (2006.01)

(52) U.S. Cl. .............. 455/575.1; 455/575.3; 455/575.5; 343/702; 343/703; 343/841

(58) Field of Classification Search .............. 455/575.3, 455/575.1, 575.5; 343/719, 702, 720, 703, 343/841
See application file for complete search history.

(56) References Cited

U.S. PATENT DOCUMENTS 5,231,407 A * 7/1993 McGirr et al. ........ 343/700 MS
5,874,920 A 2/1999 Araki et al.
6,215,454 B1 4/2001 Tran
6,483,719 B1 * 11/2002 Bachman .................... 361/816
6,978,165 B2 * 12/2005 Martinez et al. ......... 455/575.7
2001/0034242 A1 * 10/2001 Takagi ........................ 455/550
2003/0016519 A1 * 1/2003 Bachman .................... 361/818
2003/0074780 A1 * 4/2003 Doran et al. .................. 29/600

(Continued)

FOREIGN PATENT DOCUMENTS

CN 1293462 5/2001

(Continued)

OTHER PUBLICATIONS

Korean Office Action dated Sep. 13, 2005 in Korean Patent Application No. 10-2003-0052844.

(Continued)

*Primary Examiner*—Patrick N Edouard
*Assistant Examiner*—Julio Perez
(74) *Attorney, Agent, or Firm*—Ked & Associates LLP

(57) ABSTRACT

A mobile terminal has an electromagnetic interference (EMI) shielding region set at an upper side of a main body part where an internal antenna is mounted. The internal antenna may be mounted on a main printed circuit board (PCB) in order to obtain a desired radiation gain. Such a shielding region alleviates the need to use metallic shielding material or EMI spraying throughout many parts of the terminal. In addition, in order to maximize wireless characteristics of the built-in antenna, a PCB ground is removed from a folder part and a FPCB connector is moved to a position along a side of a terminal display. With this structure, degradation of radiation characteristics of the antenna due to metal components installed around the built-in antenna can be prevented, and thus a stable radiation gain of the terminal antenna can be obtained.

27 Claims, 7 Drawing Sheets

U.S. PATENT DOCUMENTS

| | | | | |
|---|---|---|---|---|
| 2003/0117324 | A1 * | 6/2003 | Iwai et al. | 343/702 |
| 2003/0148784 | A1 * | 8/2003 | Sawamura et al. | 455/550 |
| 2004/0198415 | A1 * | 10/2004 | Lin et al. | 455/550.1 |
| 2004/0214620 | A1 * | 10/2004 | Kozakai et al. | 455/575.7 |
| 2005/0024274 | A1 * | 2/2005 | Byun et al. | 343/702 |
| 2005/0164745 | A1 * | 7/2005 | Oe et al. | 455/566 |
| 2006/0063572 | A1 * | 3/2006 | Garcia et al. | 455/575.3 |
| 2006/0132363 | A1 * | 6/2006 | Neergaard et al. | 343/702 |

FOREIGN PATENT DOCUMENTS

| | | |
|---|---|---|
| EP | 1093183 | 4/2001 |
| EP | 1227434 | 7/2002 |
| JP | 3-140478 | 6/1991 |
| JP | 05-308212 | 11/1993 |
| JP | 10-247806 | 9/1998 |
| JP | 10-308618 | 11/1998 |
| JP | 2000-059120 | 2/2000 |
| JP | 2000-188506 | 7/2000 |
| JP | 2001-268190 | 9/2001 |
| JP | 2002-016418 | 1/2002 |
| JP | 2002-064601 | 2/2002 |
| JP | 2002-504767 | 2/2002 |
| JP | 2003-092510 | 3/2003 |
| JP | 2003-101335 | 4/2003 |
| KR | 1020020019203 A | 3/2002 |
| WO | 9736380 | 10/1997 |

OTHER PUBLICATIONS

Japanese Office Action dated Jul. 10, 2006.
Chinese Office Action dated Dec. 22, 2007 with Translation.
Japanese Office Action dated Nov. 6, 2007 and its English translation.
Japanese Office Action dated Mar. 22, 2007.
Korean Office Action dated Sep. 13, 2005 in Korean Patent Application No. 10-2003-0052844.

* cited by examiner

SYSTEM AND METHOD FOR OBTAINING RADIATION CHARACTERISTICS OF BUILT-IN ANTENNA IN MOBILE COMMUNICATION TERMINAL

BACKGROUND OF THE INVENTION

1. Field of the Invention

The present invention generally relates to mobile communication systems, and more particularly to a system and method for obtaining radiation gain characteristics of a built-in antenna in a mobile communication terminal.

2. Background of the Related Art

A mobile communication terminal (referred to as 'terminal', hereinafter) may generally be regarded as any portable device that transmits and receives voice, character, and/or image information with other terminals or devices.

Lately, mobile terminals are being provided with a wireless data service having a reinforced multimedia function. Also, recent trends require that mobile terminals become more compact and light-weight for carrying convenience. To meet these requirements, terminals are now using internal instead of external antennas. Internal antennas can be used to support Bluetooth, wireless LAN, GSM, CDMA and other communication protocols and formats.

FIG. 1 is a cross-sectional view of a mobile terminal 10 having an internal antenna in accordance with the related art, and FIG. 2 is a perspective view of this built-in antenna. As shown in FIG. 1, the terminal includes a main body 3 accommodating a main PCB (Printed Circuit Board) for transmitting and receiving voice and image information in a case 1. The terminal also includes a folder part 5 foldably hinged at one end of the main body and a built-in antenna 6 with one end connected to the main PCB for transmitting and receiving an electric signal to and from the main PCB. Reference numeral 4 denotes a folder case.

As shown in FIG. 2, the built-in antenna includes a carrier 11 fixed at an inner side of the case 1 and spaced apart from the main PCB, a radiator 12 attached at one side of the carrier for radiating electromagnetic waves, and a feeding terminal 14 for electrically connecting the radiator and an antenna terminal 2*a* of the main PCB through a connection line 13.

In operation, if a user inputs voice information using a microphone in a call standby state, a voice signal is converted into an electric signal, transferred through antenna terminal 2*a* of the main PCB, feeding terminal 14 and connection line 13, and then finally radiated through radiator 12. The radio signal received through the radiator 12 is transferred to main PCB 2 through connection line 13, feeding terminal 14, and antenna terminal 2*a*.

Radio frequency and electromagnetic interference (EMI) are critical factors in the design of mobile terminals and other communication products. EMI signals in particular have a strong potential to affect the operation of the internal components of the terminal, including its electronic device packages. Consequently, the frequency and level of EMI signals radiated outwardly from the interior of an electronic product are often limited.

In effort to solve such problems, electronic products include a shield device for interrupting EMI radiated from each element, or internal elements are packaged in a grounded enclosure.

In FIG. 1, portion A shows an electromagnetic wave shielding film 22 with a certain thickness formed at an inner surface of body part 21, and FIG. 3 is an enlarged sectional view of portion A. Shielding film 22 is made of sequentially plated copper and nickel and operates to shield electromagnetic waves generated from components (e.g., antenna terminal 2*a*) attached at the main PCB from being outwardly discharged.

In order to maintain the wireless characteristics of the built-in antenna against EMI, a radiator or meander line and microstrip line are simply isolated a certain distance from the main PCB, or the size of the antenna is increased. However, because built-in antenna 6 and main PCB 2 are installed to be isolated from one another by a certain distance, installation space of the built-in antenna must be secured inside the case. This inevitably increases the size of the main body case, which diminishes the ability to make the terminal compact in size.

SUMMARY OF THE INVENTION

An object of the invention is to solve at least the above problems and/or disadvantages and to provide at least the advantages described hereinafter.

Another object of the present invention is to provide a mobile terminal having a built-in antenna at a main PCB which is also compact in size.

Another object of the present invention is to provide a mobile terminal which implements satisfactory wireless characteristics for a built-in antenna of a mobile terminal, such as but not limited to folder-type mobile terminals.

Another object of the present invention is to set a ground region and position of an FPCB connector in a folder and a main body to maximize wireless performance characteristics of a built-in antenna.

To achieve at least the above objects and advantages in whole or part, the present invention provides in accordance with one embodiment a system and method for enhancing radiation gain of an antenna in a mobile communication terminal. This is accomplished by forming an antenna at a main PCB of a hinge part of the mobile terminal. Also, an electromagnetic interference (EMI) shielding region is set at an upper portion of a main body part of the terminal in order to obtain a desired radiation gain of the antenna. Through this design, use of metallic material and EMI spraying is advantageously avoided at a region of the main body part included in the EMI shielding region.

Preferably, the range of the EMI shielding region is determined by the size of the built-in antenna. Also, the range of the EMI shielding region may extend from an end of a lower side of the built-in antenna to an upper region of the main body part, although other configurations are possible.

Also, if the mobile terminal is a folder type terminal, use of a metallic material and EMI spraying are preferably avoided at the region of a folder part included in the EMI shielding region when the folder is closed. For this purpose, a PCB ground is removed from the folder part and an FPCB connector is moved from the folder part to a position opposite of the built-in antenna.

In accordance with another embodiment, the present invention provides a mobile communication terminal with a main body part having an antenna formed at one end of a main PCB, wherein an electromagnetic interference (EMI) shielding region is set at an upper side of the main body part to obtain a desired radiation gain of the antenna. Also, in this embodiment use of a metallic material and EMI spraying are preferably avoided at the EMI shielding region.

The range of the EMI shielding region may be determined by the size of the built-in antenna. Also, the range of the EMI shielding region preferably extends from an end of a lower side of the built-in antenna to an upper region of the main body part, although other configurations are possible. If the mobile terminal is a folder type, a PCB ground of the folder part may be removed and a flexible PCB (FPCB) connector of the folder part may be moved to be positioned at the side.

In accordance with another embodiment, the present invention provides a mobile terminal which includes: a main body part accommodating a main printed circuit board (PCB), a folder part hinged at the main body part; a built-in antenna assembled at one side of the main PCB, and an EMI shielding region positioned at an upper side of the main body part preferably where a built-in antenna is installed. The built-in antenna may be positioned at a hinge part, and the EMI shielding region may be a region where EMI spraying and use of a metallic material are avoided.

The EMI shielding region preferably includes portions of a front case, a rear case of the main body part, and a portion of the main PCB. The range of the EMI shielding region may be determined by the size of the built-in antenna and may extend, for example, from an end of a lower side of the built-in antenna to an upper region of the main body part.

In order to prevent the built-in antenna from being affected when the folder part is closed, a PCB ground may be removed from the folder part and the flexible PCB (FPCB) connector may be moved to a position opposite the built-in antenna.

DETAILED DESCRIPTION OF PREFERRED EMBODIMENTS

The present invention may be adopted to design a built-in antenna of a mobile terminal including but not limited to a folder-type mobile terminal. In addition, in accordance with at least one embodiment the present invention may increase and/or achieve a desired level of performance of a terminal having a built-in antenna installed at one side of an upper end portion of a main PCB.

In terms of performance, the present invention may implement wireless characteristics suitable for a built-in antenna product of a folder-type mobile terminal, specifically with respect to the relationships among radiation performance of the built-in antenna, EMI, and ground. For this purpose, a predetermined range of a main body part (including a hinge part) where the built-in antenna is installed may be set as an electromagnetic interference (EMI) shielding region in order to obtain a desired radiation gain of the antenna. In addition, to maximize the radiation gain of the antenna, an innovative PCB ground region of the folder part and a position of the FPCB connector are provided.

Figure 1:
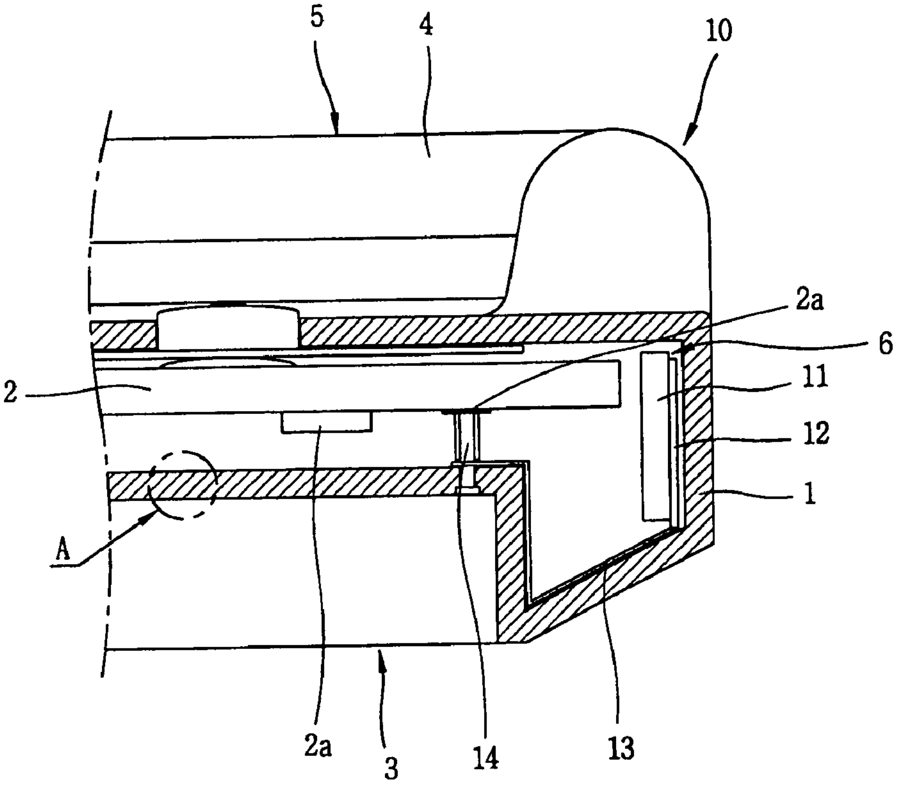
FIG.1 Related Art
FIG. 1 is a diagram showing a cut side portion of a mobile communication terminal having a built-in antenna in accordance with the related art.
Figure 2:
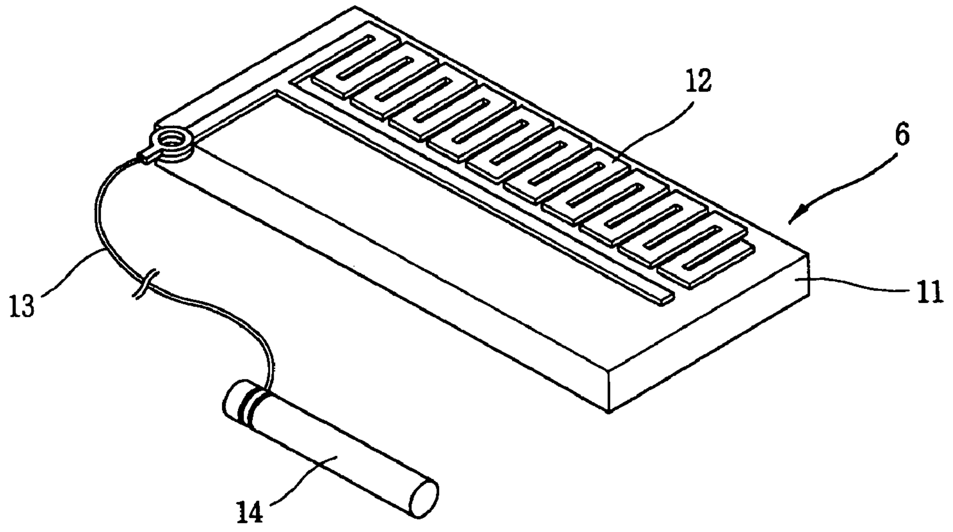
FIG.2 Related Art
FIG. 2 is a perspective view of the related-art built-in antenna.
Figure 3:
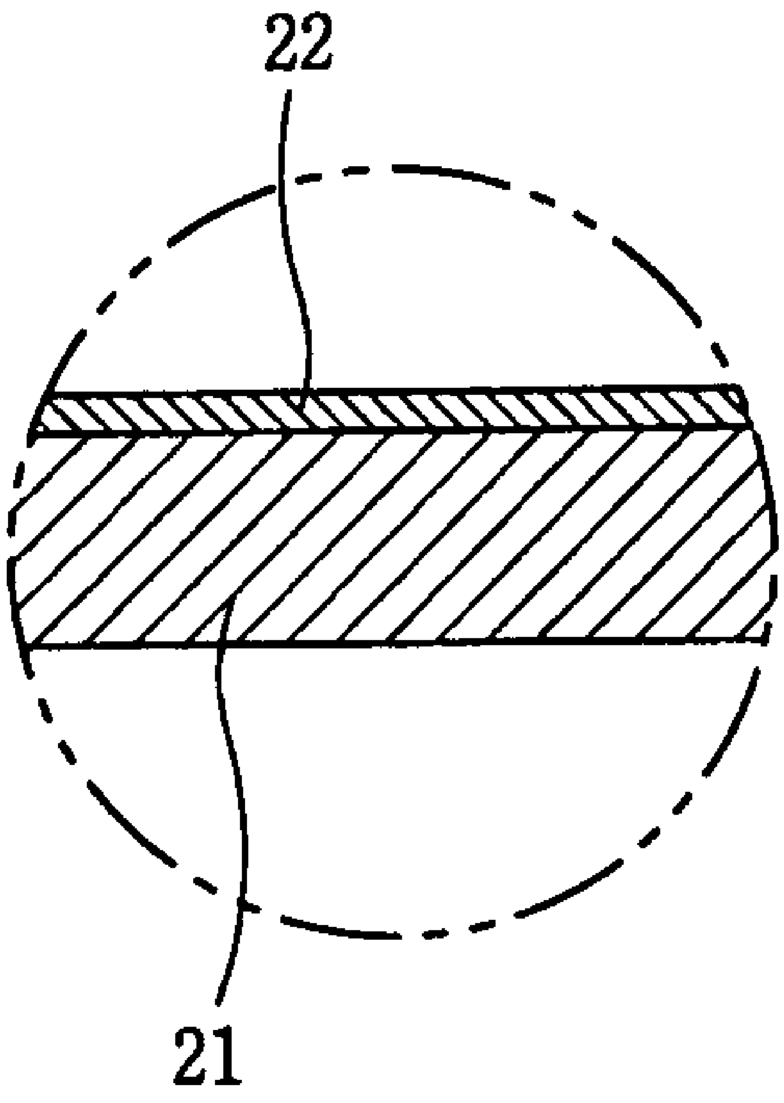
FIG.3 Related Art
FIG. 3 is an enlarged sectional view of portion A in FIG. 1.
Figure 4:
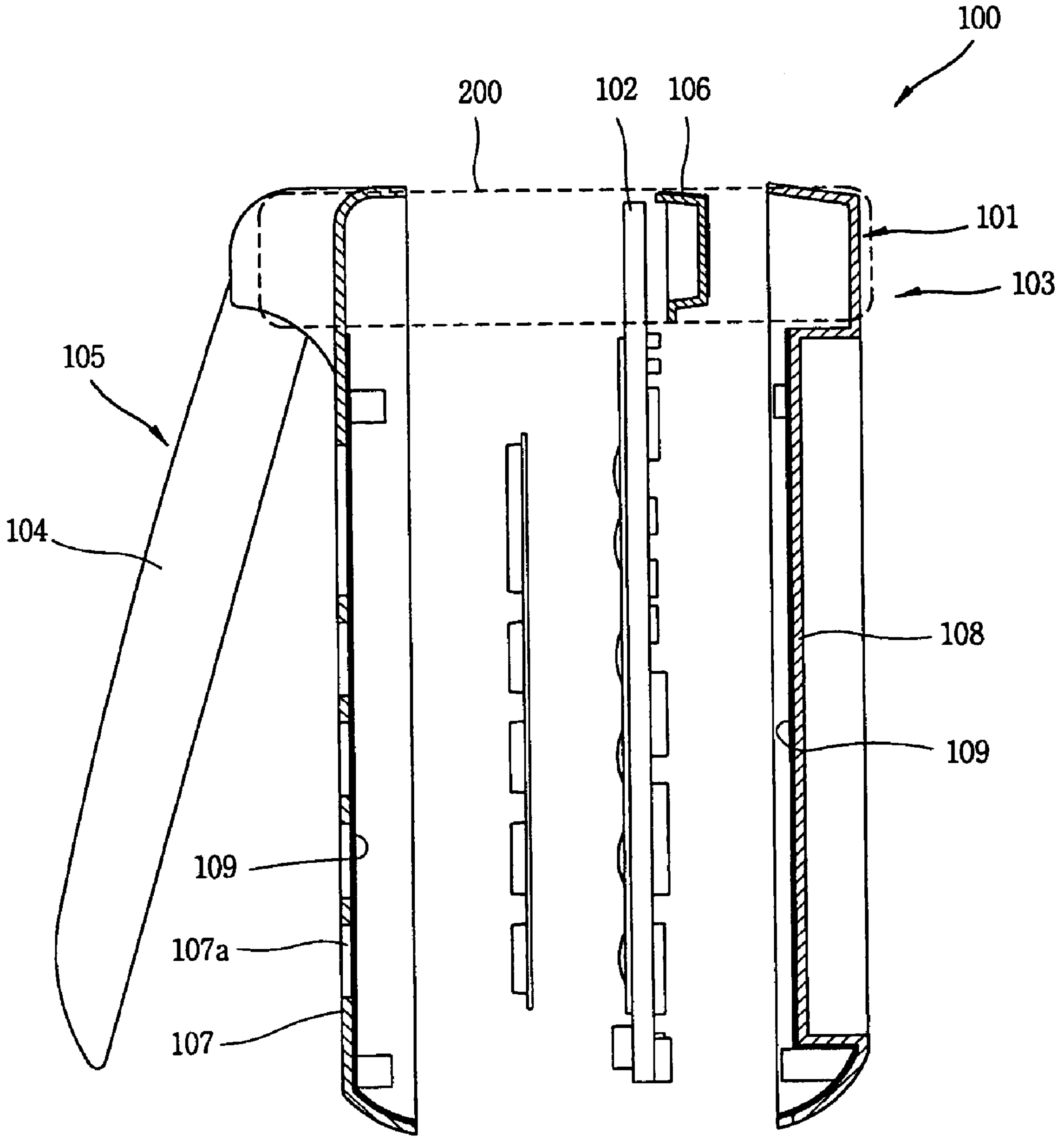
FIG. 4 is an exploded sectional view of a mobile communication terminal which adopts a radiation gain obtaining scheme of an antenna in accordance with one embodiment of the present invention.

FIG. 4 is an exploded sectional view of a mobile terminal in which a built-in antenna having an EMI shielding region is provided in accordance with one embodiment of the present invention. The mobile terminal includes a main body 103 accommodating a main PCB 102 inside a main body case 101, a folder part 105 foldably hinged to one end of the main body, an antenna 106 installed at one side of an upper end portion of the main PCB, and an EMI shielding region 200 formed at one end portion of the main body where the antenna is installed.

The main body case includes a front case 107 having a plurality of button holes 107*a* and a rear case 108 coupled at a rear surface of the front case. An electromagnetic wave shielding film 109 is preferably coated at each inner side surface of the front case and the rear case in order to shield electronic waves generated from components of the main PCB. The antenna 106 is preferably positioned at the hinge part in this embodiment; however, other locations are possible.

Because the antenna is positioned at the hinge part, the EMI shielding region 200 includes partial portions of main body 103 and folder part 105. In the EMI shielding region, use of a metallic material or EMI spraying may advantageously be excluded. If EMI spraying is performed or an element of a metallic material is positioned in the EMI shielding region, the EMI spray or the metallic material may serve as a ground, potentially degrading radiation gain characteristics of the antenna. Therefore, in this embodiment of the present invention, the built-in antenna product implemented in a folder-type mobile terminal obtains desired radiation gain characteristics of the antenna regardless of whether the folder is an open or closed position.

The boundary (range) of the EMI shielding region may be determined by the size of antenna 106. In general, a region in a specific length of an antenna carrier, and preferably every part existing at an upper portion from the folder part to an end of the antenna, corresponds to the EMI shielding region 200.

Figure 5:
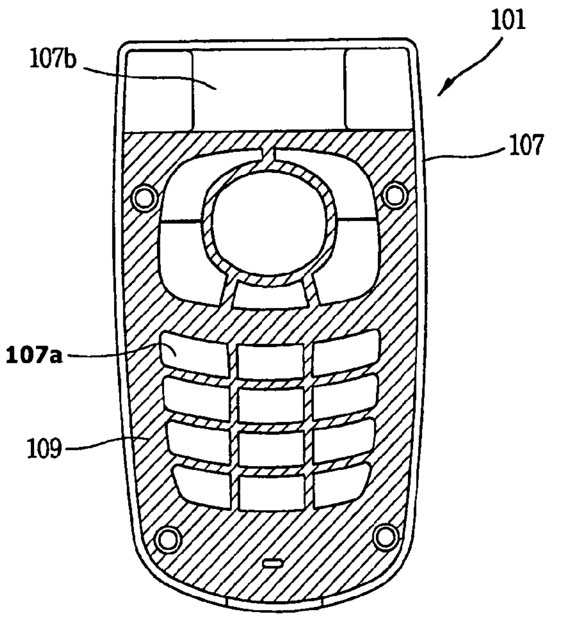
FIG. 5 is an internal front view of one type of front case of a main body that may be used in the terminal of FIG. 4.
Figure 6:
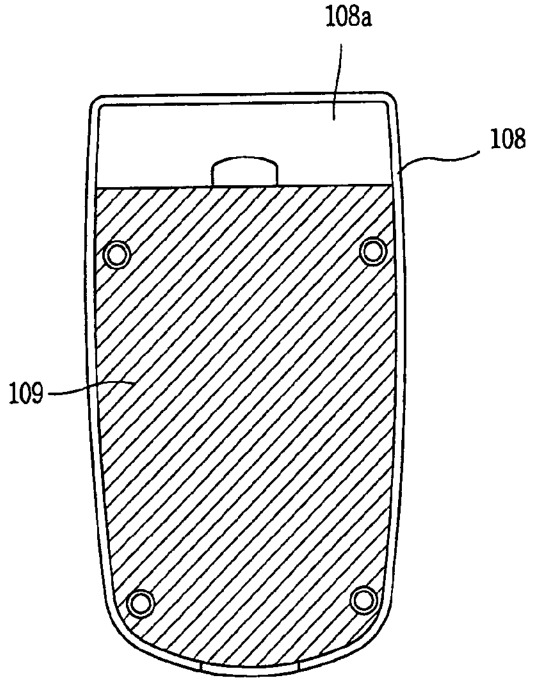
FIG. 6 is an internal front view of one type of rear case of the main body that may be used in the terminal of FIG. 4.

Also, in this embodiment a first EMI excluding portion 107*b* is formed at an upper end portion (non-shaded portion) inside the front case 107 of the main body case 101 as shown in FIG. 5, and a second EMI excluding portion 108*a* is formed at an upper end portion (non-shaded portion) inside the rear case 108 as shown in FIG. 6. The first and second EMI excluding ports are therefore included in the EMI shielding region 200.

In accordance with the present invention, factors that may affect the radiation gain characteristics of antenna 106 are preferably removed or their positions are moved to other positions away from the region of folder part 105 included in the EMI shielding region 200 when the folder part is closed. For example, a ground may be removed from a PCB of the folder part, so that the PCB of the folder part can maintain a predetermined distance from antenna 106 on the main PCB when the user opens or closes the folder.

Figure 7:
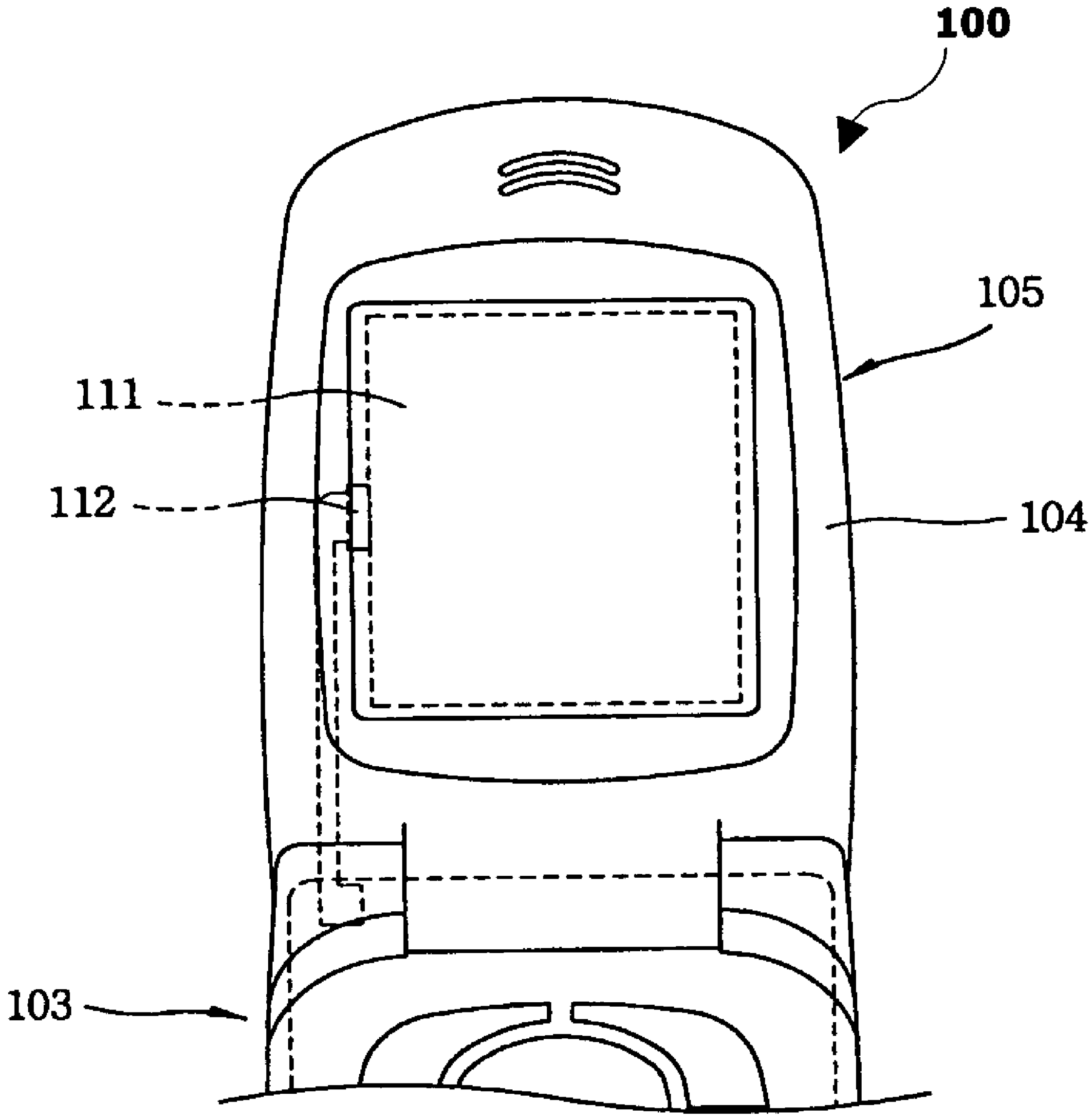
FIG. 7 is a front view showing a state where a FPCB connector is formed at a folder part in the terminal of FIG. 4.

Another example is shown in FIG. 7. Here, a flexible PCB (FPCB) connector 112 of folder part 105 which affects antenna 106 on the main PCB is moved from the lower portion of an LCD 111 to the side portion of the LCD. That is, if the FPCB connector is formed at the lower portion of the LCD, the FPCB connector could be included in the EMI shielding region 200. Thus, as one approach for excluding the FPCB connector from the EMI shielding region, the present invention may move the FPCB connector to a side portion region of the LCD. This position is advantageous because if the FPCB connector is located at the lower portion of the LCD, the FPCB connector may serve as a ground which could adversely affect the antenna characteristics. As a result, when folder part 105 is folded, the radiation characteristics of built-in antenna 106 would not be interfered with or otherwise adversely influenced by metal components of FPCB connector 112.

Figure 8:
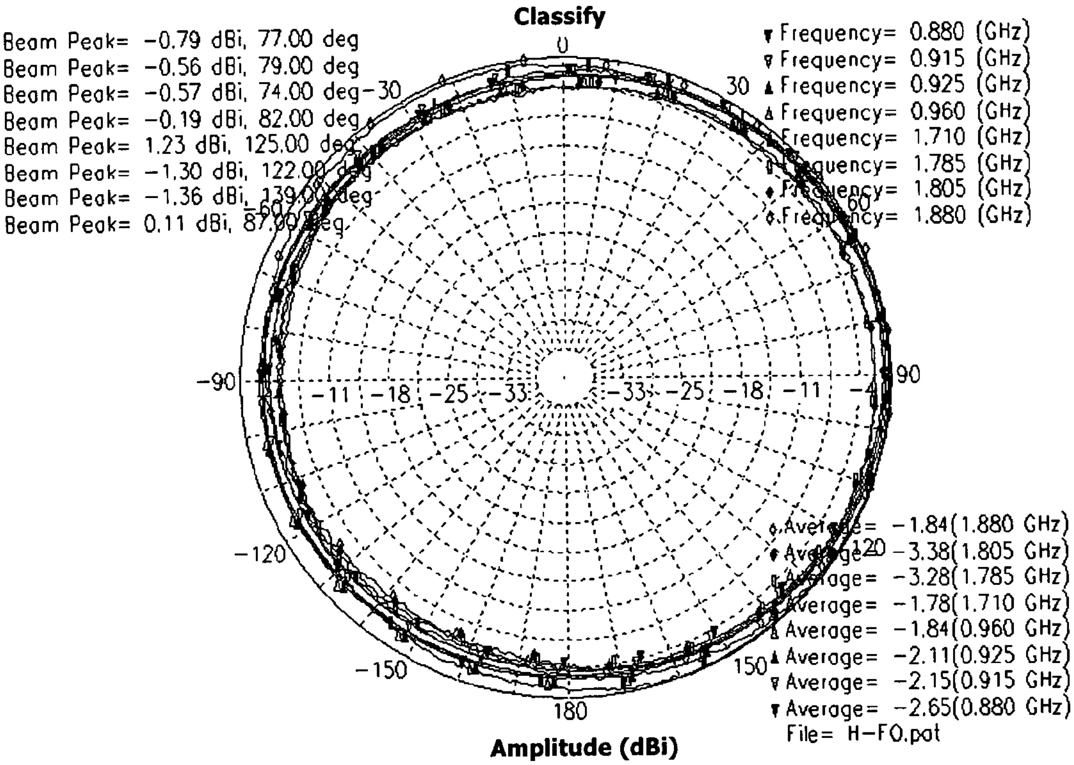
FIG. 8 is a graph showing experimental radiation gain characteristics obtained for an antenna in a state where the folder part is closed in a folder-type terminal adopting the scheme in accordance with the present invention.
Figure 9:
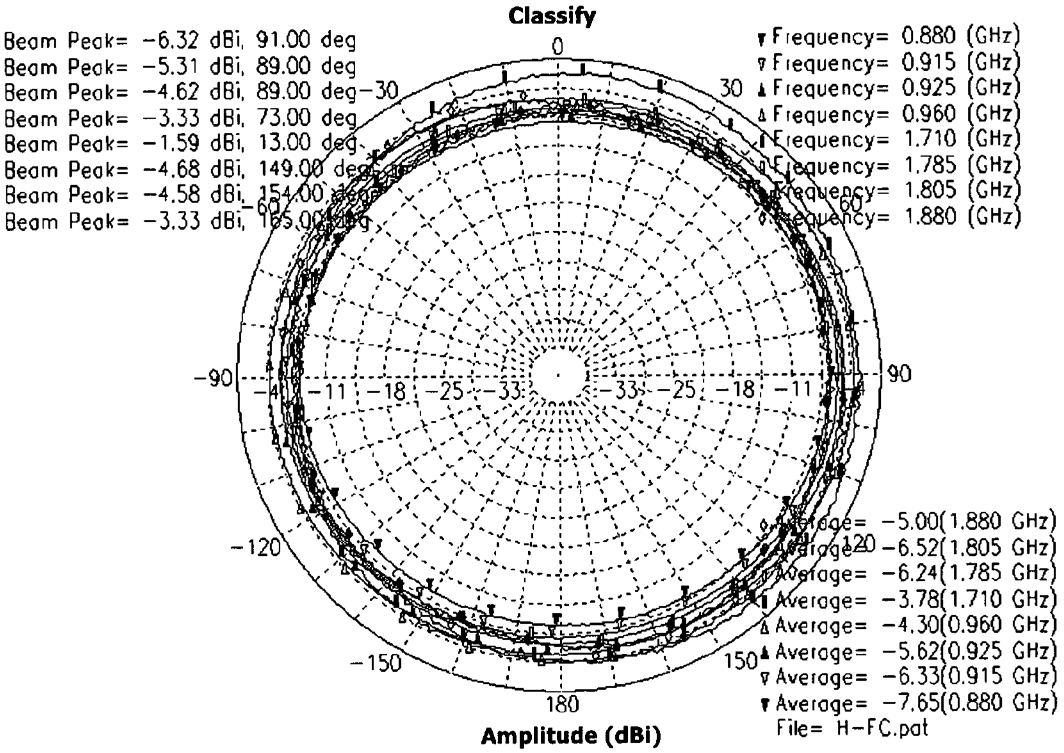
FIG. 9 is a graph showing experimental radiation gain characteristics of an antenna in a state where the folder part is open in a folder-type terminal adopting the scheme in accordance with the present invention.

FIGS. 8 and 9 are graphs showing experimental radiation gain characteristics obtained for an antenna of a folder-type terminal which adopted the scheme of the present invention. In the experiment, a distance between a terminal and a measurement-subject antenna was 5 m, and the experiment was performed in an unechoic chamber for the sake of obtaining an accurate measurement.

As shown in FIG. 8, with the folder closed a radiation gain average value for 880-960 MHz was −2 dBi and a radiation gain average value for 1710-1880 MHz is −2 dB. As shown in FIG. 9, with the folder opened a radiation gain average value for 880-960 was −5 dBi and a radiation gain average value for 1710-1880 MHz is −6 dBi. From these experimental results, it was confirmed that application of the scheme of the present invention to a folder-type terminal ensures obtaining a good radiation gain value of the built-in antenna.

As so far described, the scheme for obtaining improved radiation gain characteristics of a built-in antenna of a mobile terminal in accordance with the present invention has at least the following advantages. First, certain regions of the main body part (including the hinge part) where the built-in antenna is installed is used as a region where a metal component or a metal shielding film is not formed. This advantageously prevents degradation of radiation characteristics of the antenna due to metal components installed around the built-in antenna. As a result, a stable radiation gain of the terminal antenna can be obtained.

Second, by removing the PCB ground from the folder part and moving the position of the FPCB connector, the wireless characteristics of the built-in antenna can be Third, by installing the built-in antenna at the hinge part in accordance with the present invention, the built-in antenna can be easily implemented in a folder-type terminal, and especially in a manner which reduces the size of the antenna. As a result, the overall size of the product can be reduced.

The foregoing embodiments and advantages are merely exemplary and are not to be construed as limiting the present invention. The present teaching can be readily applied or other types of apparatuses. The description of the present invention is intended to be illustrative, and not to limit the scope of the claims. Many alternatives, modifications, and variations will be apparent to those skilled in the art.

What is claimed is:

1. A method of optimizing a radiation gain for a mobile terminal comprising a terminal body having a first region and a second region that lies outside of the first region, and an internal antenna, the method comprising:

mounting the internal antenna within the terminal body; and providing an electromagnetic interference (EMI) shielding region in the first region, wherein the internal antenna is arranged within the first region and wherein the shielding region is aligned and substantially coextensive in size with the internal antenna and wherein the shielding region enhances a radiation gain of the internal antenna, wherein:

the mobile terminal includes a folding part coupled to the terminal body by a hinge, and the shielding region that is aligned and coextensive in size with the internal antenna includes the hinge, internal antenna, an aligned portion of the terminal body, and an aligned portion of the folder part, said aligned portions of the terminal body and folding part also substantially coextensive with the size of the internal antenna, wherein the internal antenna lies entirely within the shielding region irrespective of whether the folding part is in an open or closed state relative to the terminal body.

2. The method of claim 1, wherein the shielding region includes a first EMI excluding portion on the terminal body at a location which coincides with the internal antenna.

3. The method of claim 2, wherein the shielding region includes a second EMI excluding portion on the folding part at a location which coincides with the internal antenna.

4. The method of claim 3, wherein a portion of the folding part of the terminal in the shielding region does not have metallic material and EMI shielding material.

5. The method of claim 4, wherein the portion of the terminal folding part in the shielding region excludes the metallic material and EMI shielding material when the terminal is in both a closed and open state.

6. The method of claim 4, further comprising:

positioning a flexible printed circuit board (FPCB) connector to a side portion of a display of the terminal, so that the connector is not in the shielding region when the mobile terminal is in open and closed positions.

7. The method of claim 1, wherein the shielding region shields the internal antenna to produce substantially same radiation characteristics in both open and closed positions of the folder part.

8. The method of claim 1, wherein a printed circuit board is included in the folding part, said printed circuit board maintaining a predetermined distance from the internal antenna when the folding part is in both opened and closed positions.

9. The method of claim 8, wherein said predetermined distance is maintained by providing a ground terminal at a location different from the printed circuit board in the folding part.

10. A mobile communication terminal, comprising:

a terminal body having a first region and a second region that lies outside of the first region;

an internal antenna mounted in the terminal body;

an electromagnetic interference (EMI) shielding region in the first region, and a folding part coupled to the terminal body by a hinge, wherein the internal antenna is arranged within the first region, wherein the shielding region is aligned and substantially coextensive in size with the internal antenna, wherein the internal antenna is arranged entirely within the shielding region, and wherein the shielding region enhances a radiation gain of the internal antenna, wherein the shielding region that is aligned and coextensive in size with the internal antenna includes the hinge, internal antenna, an aligned portion of the terminal body, and an aligned portion of the folder part, said aligned portions of the terminal body and folder part also substantially coextensive with the size of the internal antenna, and wherein the internal antenna lies entirely within the shielding region irrespective of whether the folding part is in an open or closed state relative to the terminal body.

11. The terminal of claim 10, wherein the shielding region includes: an EMI excluding portion formed at an area proximate a housing of the terminal at a location which coincides with the internal antenna.

12. The terminal of claim 10, wherein the shielding region allows the internal antenna to achieve a desired radiation gain, said gain being achieved without including metallic EMI shielding material on a region of a terminal body that lies within the shielding region.

13. The terminal of claim 12, wherein the EMI shielding material includes EMI sprayed material formed on a region of the terminal body that lies within the shielding region.

14. The terminal of claim 10, wherein a range of the shielding region is based on a size of the internal antenna.

15. The terminal of claim 10, wherein the internal antenna is coupled in a circuit board of the terminal.

16. The terminal of claim 10, wherein a PCB ground is removed from one of the first region or the second region where the internal antenna is arranged within said one of the first region or the second region.

17. The terminal of claim 10, wherein the second region includes a keyboard of the mobile terminal.

18. The terminal of claim 10, wherein the shielding region does not overlap a keyboard or a screen of the mobile terminal.

19. A mobile communication terminal, comprising:

a first body having a first region and a second region that lies outside of the first region;

a second body connected to the first body by a hinge, the second body having a first portion and a second portion, wherein the first portion and the second portion correspond to the first region and the second region of the first body respectively when the second body is closed;

an internal antenna mounted in the first body; and an EMI shielding region included in the first region, wherein the internal antenna is arranged within the first region, and wherein the EMI shielding region further includes the hinge, the first region of the first body, the portion of the second body that corresponds to the first region of the first body, and the internal antenna, wherein the shielding region is aligned and substantially coextensive in size with the internal antenna, wherein the internal antenna lies entirely within the shielding region, and wherein the shielding region enhances a radiation gain of the internal antenna.

20. The terminal of claim 19, wherein the shielding region includes:

a first EMI excluding portion on the first body at a location which coincides with the internal antenna; and a second EMI excluding portion on the second body at a location which coincides with the internal antenna.

21. The terminal of claim 19, wherein the shielding region encompasses a portion of the first body adjacent to the internal antenna.

22. The terminal of claim 19, wherein the internal antenna is located where the first body is hinged to the second body.

23. The terminal of claim 19, wherein the shielding region does not include metallic material and EMI shielding material.

24. The terminal of claim 19, wherein the shielding region includes portions of a front housing, a rear housing, and a portion of a circuit board of the first body.

25. The terminal of claim 24, wherein a PGB ground is removed from one of the first region or the second region where the internal antenna is arranged within said one of the first region or the second region.

26. The terminal of claim 19, wherein a range of the shielding region is based on a size of the internal antenna.

27. The terminal of claim 19, further comprising:

a display, and a flexible printed circuit board (FPCB) connector located at a side portion of the display, so that the connector is not in the shielding region when the second body is in open and closed positions.

* * * * *